United States Patent Office 3,358,359
Patented Dec. 19, 1967

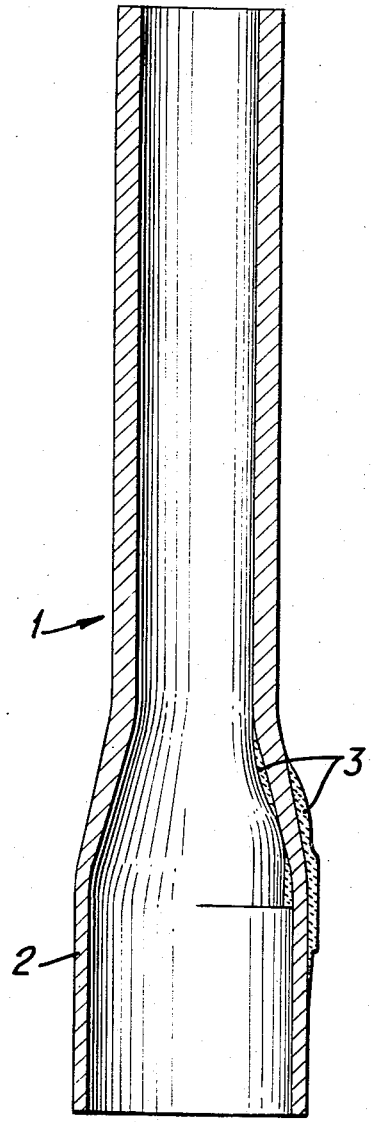

3,358,359
METHOD OF MAKING A SOCKET MOLD
Wilhelm Görtzen, Gelsenkirchen, Germany, assignor to Rheinstahl Huttenwerke A.G., Essen, Germany
Filed Jan. 19, 1965, Ser. No. 426,516
Claims priority, application Germany, Mar. 13, 1964, R 37,441
3 Claims. (Cl. 29—529)

This invention relates in general to the construction of ingot molds for centrifugal casting and to a method of making such molds, and in particular to a method of making a centrifugal socket mold, and to a socket mold construction.

Centrifugal ingot molds which are to be used for centrifugal casting of iron socket pipes are preferably produced from forged steel ingots by boring or turning. The manufacturing method is rather expensive. It requires a high material consumption and comprehensive metal cutting. The cost of a centrifugal ingot mold represents therefore a considerable portion of the cost price of the socket pipes which are centrifuged in such molds.

Many proposals have been made to reduce the cost of such molds per ton of pipes which are cast. Such methods include measures for increasing the number of castings and also measures for forming cheaper ingot molds. For example, it has been suggested to make centrifugal ingot molds of other materials, for example copper molds or contrifugal ingot molds of multi-layers of different materials. It is known, for example, to use a thin-walled inner part and casting a thicker outer part around it, the thin-walled inner part consisting of a smooth steel pipe and the socket part being welded thereon. It has also been attempted to use a centrifugal ingot mold which consists only of a seamless steel pipe with the socket welded on the pipe. Such a method, however, does not provide sufficient safety in view of the great stresses which will act on the mold due to sudden changes in temperature during use. The structural soundness of such molds is particularly important in centrifugal casting because cooling water can come in contact with the liquid iron when the mold breaks and cause explosions.

In accordance with the present invention there is provided a simple and inexpensive seamless drawn steel pipe centrifugal ingot mold construction which is made in accordance with the method of the invention by widening one end of the pipe to a funnel shape and supplementing the widened portion with built-up welding to the necessary socket profile of the centrifugal socket mold. In accordance with the method of the invention, the wall thickness of the funnel-shaped widened portion is reduced during widening so that the mold has a lower wall thickness at this funnel-shaped end than the normal wall thickness of the steel pipe. It is not possible to obtain the necessary cross sectional form of the socket portion of the mold by a simple widening on the inside and the outside of the pipe. The necessary dimensioned form is achieved in accordance with the invention by subsequent built-up welding, particularly of a type so-called powder built-up welding. In a preferred arrangement, after the built-up welding is completed, the exact inner and outer profile of the socket end of the mold is produced by simple machining, for example by turning and grinding.

Accordingly, it is an object of this invention to provide improved socket mold for centrifugal casting.

A further object of the invention is to provide a method of producing a socket mold for centrifugal casting from a seamless drawn steel pipe by widening the pipe to a funnel shape at its one end and adding onto the inside or the outside of the widened area by welding to the required dimension and subsequently machining the mold to the desirable form and shape.

A further object of the invention is to provide an ingot mold which is simple in design, rugged in construction and economical to manufacture and also to provide an improved method of making such mold.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawing is a transverse sectional view of an ingot mold constructed in accordance with the invention.

Referring to the drawing in particular, the invention embodied therein comprises a seamless steel pipe 1 having an end 2 which is widened to a funnel shape, as indicated.

In accordance with the method of the invention, the widened end 2 is finally formed by applying build-up welding as indicated at 3, either onto the inside or the outside surfaces or on both sides, as shown in the drawing. After a sufficient welding is built up in the areas which have been reduced in diameter because of the widening, the mold is subjected to simple machining, for example to turning or grinding, in order to form a final desired mold shape. The welding is preferably of a type referred to as built-up welding and advantageously may be a powder built-up welding.

While a specific embodiment of the invention has been shown and described in detail to illustrate the application of the inventive principles, it will be understood that the invention may be embodied otherwise without departing from such principles.

The embodiment of the invention in which an exclusive property or privilege is claimed is defined as follows:

1. A method for producing socket molds for use in centrifugal casting from a seamless drawn steel pipe comprising widening the steel pipe adjacent one end into a funnel-shaped configuration of reduced thickness and supplementing the thickness on at least one side of the wall of the widened portion by built-up welding.

2. A method for producing socket molds for use in centrifugal casting from a seamless drawn steel pipe comprising widening the steel pipe adjacent one end into a funnel-shaped configuration of reduced thickness and supplementing the thickness on each side of the wall of the transition portion between the original tube and the widened portion by powder built-up welding.

3. A method for producing socket molds for use in centrifugal casting from a seamless drawn steel pipe comprising widening the steel pipe adjacent one end into a funnel-shaped configuration of reduced thickness and supplementing the thickness on each side of the wall of the transition portion between the original tube and the widened portion by powder built-up welding, and thereafter machining said mold into the desired socket form of the cast ingot to be produced.

References Cited

UNITED STATES PATENTS

| | | | |
|---|---|---|---|
| 1,828,200 | 10/1931 | Perry | 249—174 |
| 2,275,585 | 3/1942 | Chace | 29—528 |
| 2,641,804 | 6/1953 | Marburg | 249—174 |
| 2,836,864 | 6/1958 | Biganzoli | 164—291 |
| 2,931,098 | 4/1960 | Johnson | 29—528 |
| 2,940,143 | 6/1960 | Daubersy et al. | 164—5 |
| 3,006,064 | 10/1961 | Watson | 29—401 |
| 3,006,065 | 10/1961 | Watson | 29—401 |
| 3,007,231 | 11/1961 | Garver | 29—529 |
| 3,127,643 | 4/1964 | Welz | 164—296 |
| 3,248,788 | 5/1966 | Goldstein et al. | 29—529 |
| 3,305,918 | 2/1967 | Christen et al. | 29—529 |

JOHN F. CAMPBELL, *Primary Examiner.*

P. M. COHEN, *Assistant Examiner.*